(12) United States Patent
Serrano et al.

(10) Patent No.: US 6,181,500 B1
(45) Date of Patent: Jan. 30, 2001

(54) SELF SERVO REWRITE METHOD AND APPARATUS

(75) Inventors: Louis Joseph Serrano; Mantle M. Yu, both of San Jose, CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/062,140

(22) Filed: Apr. 17, 1998

(51) Int. Cl.$^7$ .................................................. G11B 5/09
(52) U.S. Cl. .................................................. 360/53
(58) Field of Search .................... 360/48, 53, 75, 360/77.08

(56) References Cited

U.S. PATENT DOCUMENTS

| | | |
|---|---|---|
| 4,536,809 | 8/1985 | Sidman . |
| 4,669,004 | 5/1987 | Moon et al. . |
| 4,823,330 | 4/1989 | Arter et al. . |
| 4,942,564 | 7/1990 | Hofer et al. . |
| 5,293,276 | 3/1994 | Dunn et al. . |
| 5,317,468 | 5/1994 | Wakabayashi et al. . |
| 5,402,280 | 3/1995 | Supino . |
| 5,541,784 * | 7/1996 | Cribbs et al. ............... 360/75 |
| 5,553,086 * | 9/1996 | Sompel et al. ............. 371/47.1 |
| 5,583,842 | 12/1996 | Wilson et al. . |
| 5,668,679 * | 9/1997 | Swearingen et al. ......... 360/75 |
| 5,710,677 * | 1/1998 | Teng et al. .............. 360/77.08 |
| 5,875,064 * | 2/1999 | Chainer et al. .............. 360/75 |
| 5,949,603 * | 9/1999 | Brown et al. ............... 360/75 |

FOREIGN PATENT DOCUMENTS

| | | |
|---|---|---|
| 59-146484 | 8/1984 | (JP) . |
| 3-160614 | 7/1991 | (JP) . |
| 5-144180 | 6/1993 | (JP) . |

* cited by examiner

Primary Examiner—W. Chris Kim
(74) Attorney, Agent, or Firm—Altera Law Group, LLC (57) ABSTRACT

A method and apparatus is disclosed that detects servo sectors that contain defects that need to be rewritten and writes in the servo field to correct the detected defects. The system includes a disk for storing data in data regions, the disk further comprising a plurality of servo regions formed radially between the data regions, a motor for rotating the disk, an actuator arm assembly including a head for reading and writing data on the disk and drive electronics for detecting defective servo sectors on the disk and rewriting a servo in the servo sector to correct the detected defective servo sectors. The drive electronics further includes arm electronics, coupled to the head, for receiving read and write signals for reading and writing data on the disk, a channel electronics circuit, coupled to the arm electronics, for rewriting the servo on the disk in response to a trigger, an interface processor, coupled to the channel electronics circuit, for processing control signals and data between the channel electronics circuit and a host processor and a servo processor, coupled to the interface processor, for analyzing detected servo fields to detect servo signals and errors therein and to provide the trigger for initiating a servo rewrite by the channel electronics circuit.

29 Claims, 5 Drawing Sheets

SELF SERVO REWRITE METHOD AND APPARATUS

BACKGROUND OF THE INVENTION

1. Field of the Invention

This invention relates in general to a method and apparatus for performing self servo rewrites, and more particularly to a method and apparatus for detecting servo errors and rewriting the servo data.

2. Description of Related Art

Disk drives typically employ electromagnetic read/write heads to store and recover information from the recording surfaces of rotating disks. The disks generally include a high coercivity magnetic storage layer at each planar surface. Data is normally stored along concentric data tracks in the magnetic storage layer. For disk drives having more than one data recording surface, the set of tracks at a common radial location is referred to as a cylinder. Head positioning relative to a track or cylinder is usually performed using a closed-loop servo scheme, so that the head(s) can be precisely positioned for track following. Servo data may be recorded on a dedicated disk surface (i.e., "dedicated-servo") or embedded in every track of every recording surface (i.e., "embedded-servo"). The latter servo scheme tends to provide more accurate head positioning and in the case of a disk drive having a few disks, an embedded-servo scheme will tend to use a smaller percentage of the potential data storage area for servo overhead. Accordingly, disk drives incorporating embedded-servo schemes currently dominate the market.

Typically a data track is divided up into a number of blocks for storing user data. The actual number of data blocks depends upon the size of each block, as measured in the number bytes stored therein, the radius of the track, the data transfer rate, etc. The embedded servo sectors may follow the data rates of the data blocks, or they may be recorded e.g. at a single rate across the radial extent of the disk, thereby interrupting and splitting fixed length data blocks into segments.

In order for an embedded servo drive to operate properly, the servo information defining the position of the data tracks must be written with great accuracy. Typically, the servo information is written on each surface which is transverse to and interspersed between data tracks. This information typically includes a sector identifier (SID), binary position information and an analog position error sensing (PES) burst pattern. Other formats and servo patterns are also employed within embedded servo disk drives. Coarse positioning is provided by the binary position information with fine head positioning relative to a track center can be determined and corrected, if necessary, by reading and noting the respective amplitudes and timings of these latter offset bursts.

Traditionally, the machine used to write the embedded servo information is called servowriter. A servowriter typically includes a large, massive granite base to minimize the effects of vibration, precision fixtures to hold the target disk drive, a precision laser interferometer based actuator arm positioning mechanism to position the arms radially with respect to the axis of rotation of the disks in the drive, and an external clock head to position the servo information on time(i.e., generally in a radial direction). Once the set is written, a read back procedure is employed while the disk drive head and disk assembly remains at the servo writer station in order to verify that the servo information have validly been written and will be useful by the disk drive head positioner servo loop during subsequent drive operations.

Due to the incorporation of large granite structures, laser based sensors, and high precision fixtures, present servowriters are extremely large and expensive.

During the manufacture of the disk drive, the above described servo information is permanently written on the disk by the servowriters. Unfortunately, sometimes the information written is erroneous. In this case it is usually only a few sectors on the drive that are miswritten; but this can be enough that the drive needs to be reservowritten. Worse, the false servo information may lead to rework in some other, expensive, way.

One proposed solution is to exhaustively check each file at the servo writer itself. A disadvantage of this solution is that the extensive checking is time consuming, which ties up capital equipment and so adversely effects profit margins for the disk drives. In effect, this type of check will more than double the cost to servowrite the file. Furthermore, even if the drive passes the manufacture test, asperities at the servo region may develop on the disk at a later time.

It can be seen that there is a need for a method and apparatus that corrects errors that occur during servowriting without requiring the disk to be re-servowritten, i.e., rewriting the servo information for the entire disk.

It can also be seen that there is a need for a method and apparatus to detect defective servo sectors need to be rewritten and to correct defective servo sectors by writing in the servo fields.

SUMMARY OF THE INVENTION

To overcome the limitations in the prior art described above, and to overcome other limitations that will become apparent upon reading and understanding the present specification, the present invention discloses a method and apparatus that fixes errors that occur during servowriting without requiring the disk to be re-servowritten.

The present invention provides a method and apparatus that detects the servo sectors that contain defects that need to be rewritten and writes in the servo field to correct the detected defects.

A system in accordance with the principles of the present invention includes a disk for storing data in data regions, the disk further including a plurality of servo regions radially formed between the data regions, a motor for rotating the disk, an actuator arm assembly including a head for reading and writing data on the disk and drive electronics for detecting the defective servo sectors on the disk that need to be rewritten and correcting the detected servo sectors candidates.

Other embodiments of a system in accordance with the principles of the invention may include alternative or optional additional aspects. One such aspect of the present invention is that the disk drive further includes arm electronics, coupled to the head, for receiving read and write signals for reading and writing data on the disk, a channel electronics circuit, coupled to the arm electronics, for rewriting the servo on the disk in response to a trigger, an interface processor, coupled to the channel electronics circuit, for processing control signals and data between the channel electronics circuit and a host processor and a servo processor, coupled to the interface processor, for analyzing detected servo fields to detect servo signals and errors therein and to provide the trigger for initiating a servo rewrite by the channel electronics circuit.

In accordance with the present invention a method for performing self servo rewrites is provided comprising the step of detecting defective servo sectors on a disk.

Another aspect of the present invention is that the step of detecting defective servo sectors on a disk further includes the steps of detecting which servo sectors contain errors.

Another aspect of the present invention is that the errors includes track ID errors, sector ID errors, or PES errors.

Another aspect of the present invention is that the step of detecting servo sectors on a disk that are candidates for rewrite is performed by drive electronics.

Another aspect of the present invention is that the step of detecting servo sectors on a disk that are candidates for rewrite is performed by a host computer.

Another aspect of the present invention is that the step of rewriting in the servo field further includes the steps of overriding write blocking that prevents an overwriting of original servo fields.

Another aspect of the present invention is that the step of rewriting in the servo field further includes the steps of configuring a pattern to be written.

Another aspect of the present invention is that the method further including the steps of writing the pattern to registers and triggering a delayed writing of the pattern on the disk.

Another aspect of the present invention is that the step of triggering the delayed writing of the pattern on the disk further includes the step of detecting a sector ID and issuing a trigger for initiating the delayed writing of the pattern on the disk in response to the detection of the sector ID.

Another aspect of the present invention is that the step of rewriting in the servo field further includes the steps of determining when the servo rewriting is to be performed.

Another aspect of the present invention is that the step of rewriting in the servo field further includes the step of synchronizing a rewriting of a pattern with data previously recorded in servo sectors on the disk.

Yet another aspect of the present invention is that the step of synchronizing a rewriting of a pattern with data in the previously recorded in servo sectors on the disk further includes the steps of triggering on a servo ID mark on the servo sector and aligning the pattern according to a write clock.

Another aspect of the present invention is that the step of aligning the pattern according to a write clock further includes the step of phase locking the write clock with the original data using a servo AGC field.

Another aspect of the present invention is that the step of rewriting in the servo field further includes the step of rewriting a pattern on the disk in the sector field within a predetermined time of original servo data.

Another aspect of the present invention is that the step of rewriting a pattern on the disk in the sector field within a predetermined time of original servo data further includes the step of aligning a write clock to a servo ID from a prior sector.

Another aspect of the present invention is that the step of rewriting in the servo field further includes the step of rewriting servo information while serving on previously written servo data.

Another aspect of the present invention is that the step of rewriting in the servo field further includes the step of rewriting only a portion of the servo sector Another aspect of the present invention is that the step of rewriting in the servo field further includes the step of writing a servo field identifying portions of the servo sector that are valid.

Another aspect of the present invention is that the step of rewriting in the servo field further includes the step of writing a servo field identifying portions of the servo sector that are invalid.

Another aspect of the present invention is that the step of rewriting in the servo field further includes the step of writing a first and second servo field containing identifying information regarding valid and invalid portions of the servo sector, wherein the first servo field is at the read center and the second servo field is at the write center.

Another aspect of the present invention is that the step of rewriting in the servo field further includes the step of rewriting servo sectors during operation in a customer environment.

Still another aspect of the present invention is that the step of rewriting in the servo field further includes the step of rewriting servo sectors to recover sites formerly affected by thermal asperities.

Another aspect of the present invention is that the step of rewriting in the servo field further includes the step of erasing a portion of the servo pattern.

Another aspect of the present invention is that the step of rewriting in the servo field further includes the step of writing a constant frequency pattern in the servo sector.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that detects the servo sectors that contain defects that need to be rewritten and writes in the servo field to correct the detected defects.

Figure 1:
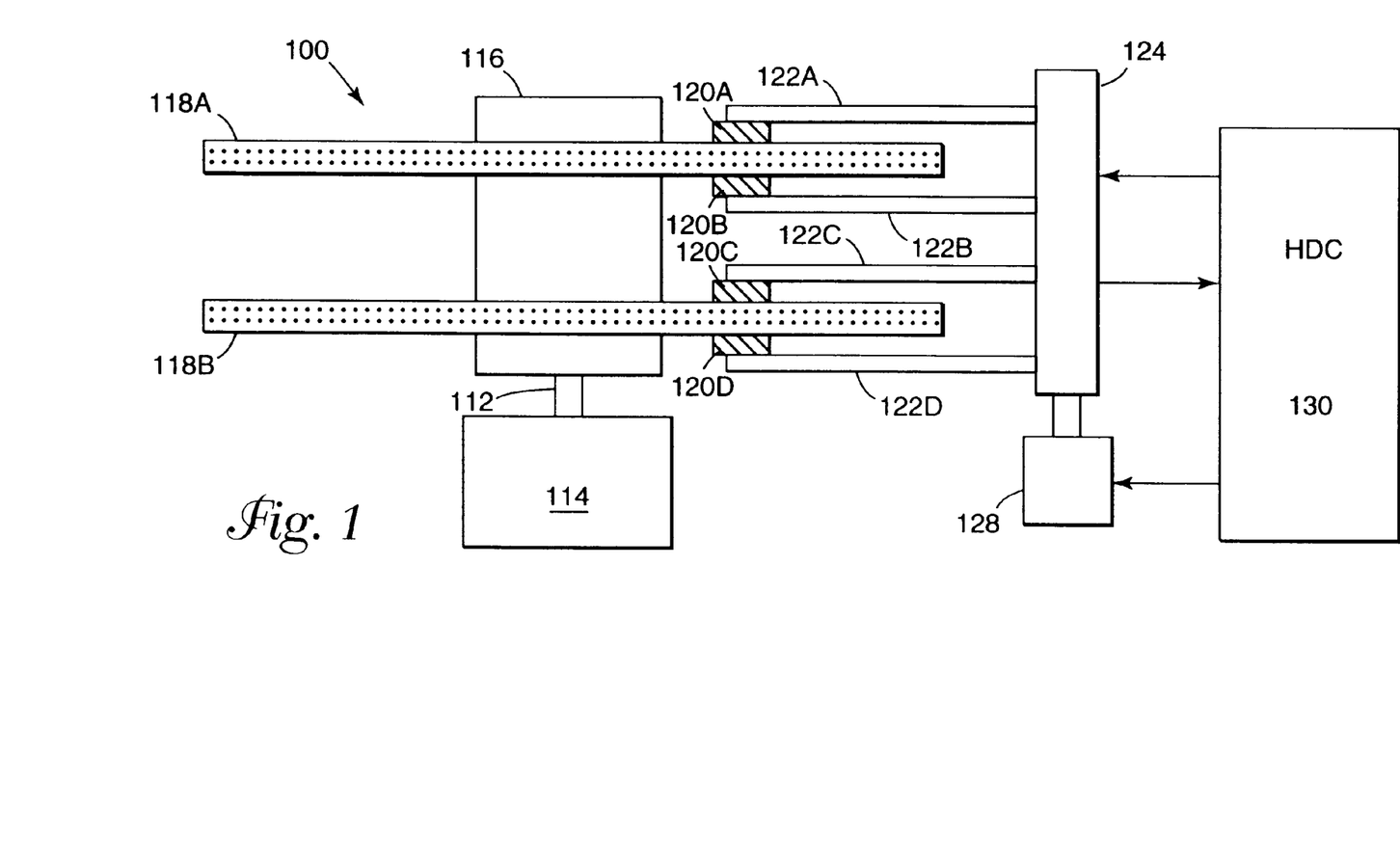
FIG. 1 illustrates an hard disk drive (HDD)

FIG. 1 illustrates a hard disk drive (HDD) 100. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and moved on the disk 118 to a predetermined position.

Figure 2:
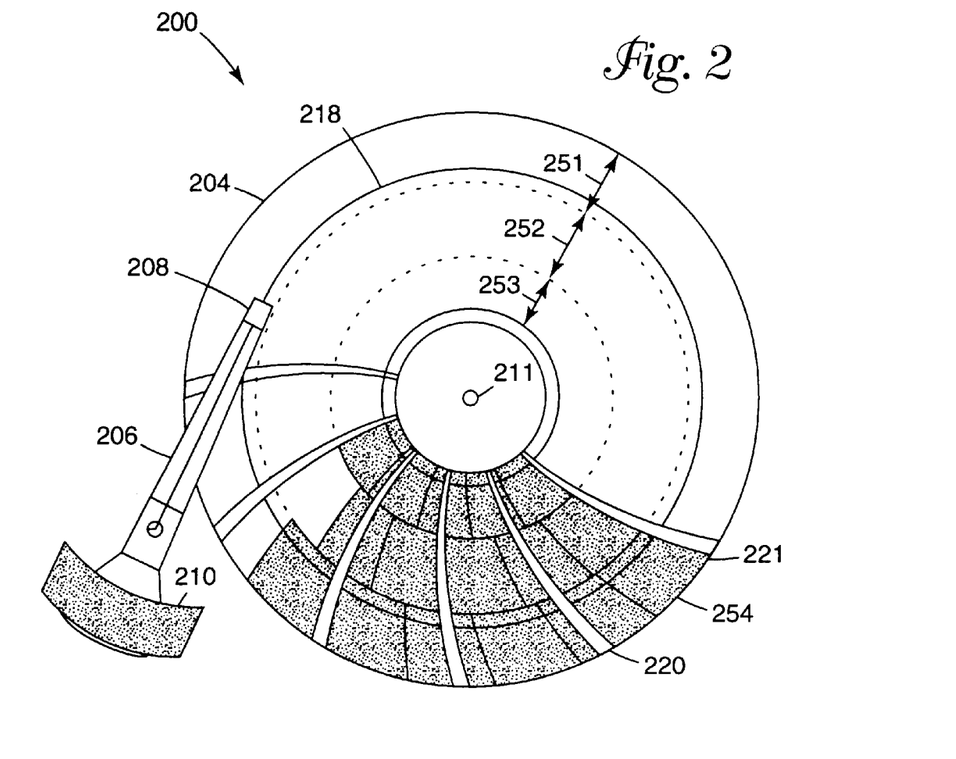
FIG. 2 illustrates the recording surface of a conventional disk.

FIG. 2 illustrates a recording surface of a conventional disk 200. As shown in FIG. 2, the disk is formatted with a fixed block architecture having sector servo and zone-bit recording. Also illustrated in FIG. 2 with the disk, designated generally as 204, is an actuator arm 206, data recording transducer 208 (also referred to as a recording head) and a voice coil motor 210. The storage disk 204 also includes center of rotation 211, and is divided for head positioning purposes into a set of radially spaced tracks one of which is shown at 218. The tracks are grouped radially into a number of zones, three of which are shown as 251, 252, 253. Data is recorded at a different data rate in each zone to maximize bit density across the disk. The disk contains a plurality of servo sectors 220, which extend across the tracks in a generally radial direction. These will be described in more detail subsequently.

Each track has a reference index 221. Within each zone, the tracks are circumferentially divided into a number of data sectors 254. Preferably the data sectors contain no sector ID fields for increased data capacity, as described in U.S. Pat. No. 5,523,903 to Hetzler et al. In accordance with the normal meaning of "fixed block architecture", all data sectors are substantially the same size, e.g., 512 bytes of data. However, it should be noted that the present invention may easily be adapted to variable length architectures. The number of data sectors per track varies from zone to zone. consequently, some of the data sectors are split by servo sectors. If the disk drive has multiple heads, then the set of tracks which are at the same radius on all surfaces is referred to as a "cylinder."

Conventional servo-patterns in the servo regions 220 typically include short bursts of a constant frequency signal, very precisely located offset from a data track's center line, on either side. The bursts are written in the sector area 220, and can be used to find the center line of a track. Staying on center is required during both reading and writing. These servo-data areas 220 allow a head to follow a track center line around a disk, even when the track is out of round, as can occur with spindle wobble, disk slip and/or thermal expansion. As technology advances provide smaller disk drives, and increased track densities, the placement of servo data in the servo regions 220 must also be proportionately more accurate.

Figure 3:
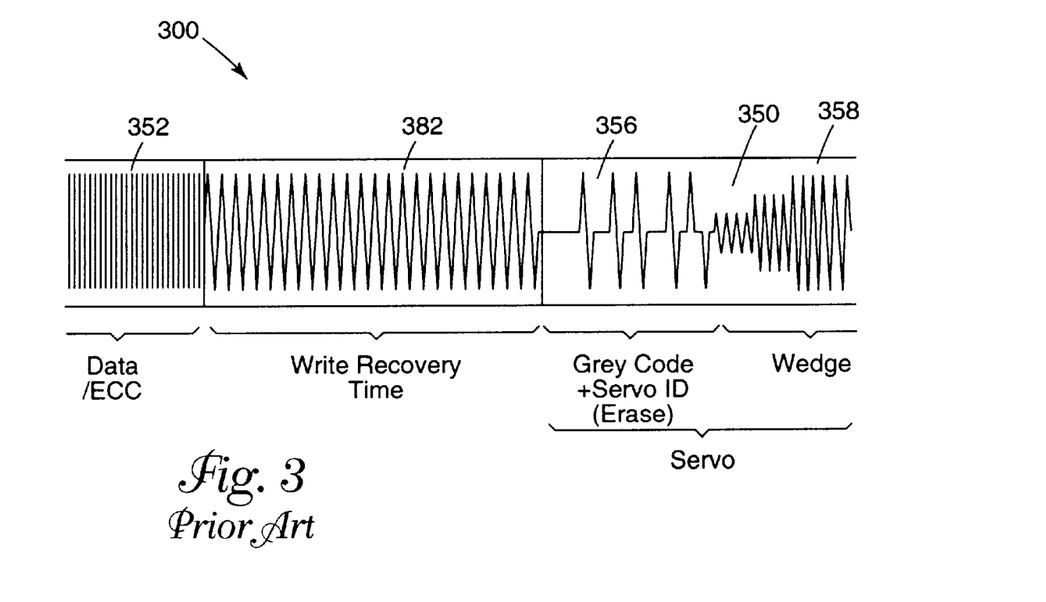
FIG. 3 shows a conventional track signal construction.

FIG. 3 shows a prior art track signal construction 300. The main structural elements are data regions 352 and servo regions 350, and in the servo regions 350, there are recorded a gray code 356 for coarsely adjusting the head position, and a servo signal 358 formed of a burst pattern for finely adjusting the head position. The data region has a signal for data error recovery such as error correction codes (ECC). Between the data region 352 and the servo region 350, a write recovery area 382 is formed. As stated above, this region provides a signal for ensuring the adjustment and control time for AGC and a read amplifier when the system mode is changed from the write mode in the data region 352 to the read mode before the next servo region 350 is reached.

Figure 4:
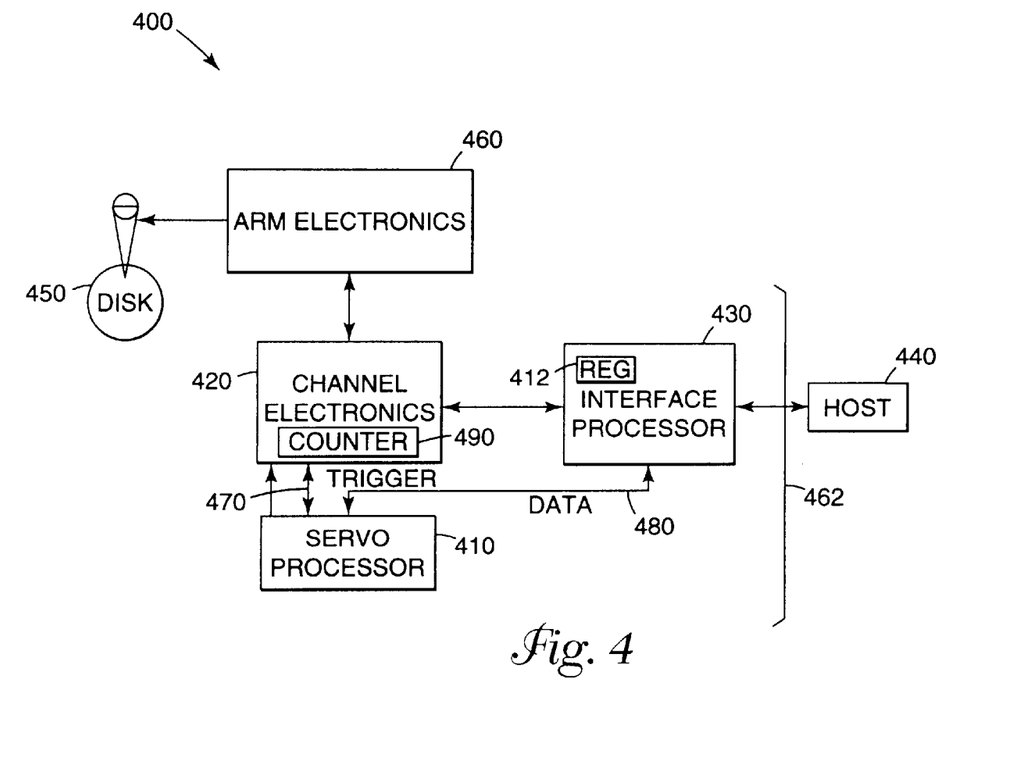
FIG. 4 illustrates one embodiment of the self servo rewrite apparatus according to the present invention.

FIG. 4 illustrates one embodiment of the self servo rewrite apparatus 400 according to the present invention. In FIG. 4, a servo processor 410 determines the information to be written and stores the data in a register 412. For example, a register 412 for storing the data may be provided in either the channel electronics 420 or the interface processor 430. For ease of explanation, only a register 412 in the interface processor 430 is shown in FIG. 4.

The servo processor 410 provides the timing signals to the channel electronics 420. The host 440 may determine the sectors to be rewritten to the disk 450 via the arm electronics 460. Alternatively, the drive electronics 462 may determine the sectors to be written to the disk 450. The interface processor 430 overrides the protective safeguards for writing in the servo fields, and the servo pattern is generated, e.g. by the channel electronics 420 or the servo processor 410. A trigger line 470 is provided to trigger a counter 490 in the drive electronics 462 to write the servo pattern to the disk 450. A data line 480 is provided between the servo processor 410 and the interface processor 430 for the passing of data between the servo processor 410 and the interface processor 430.

Figure 5:
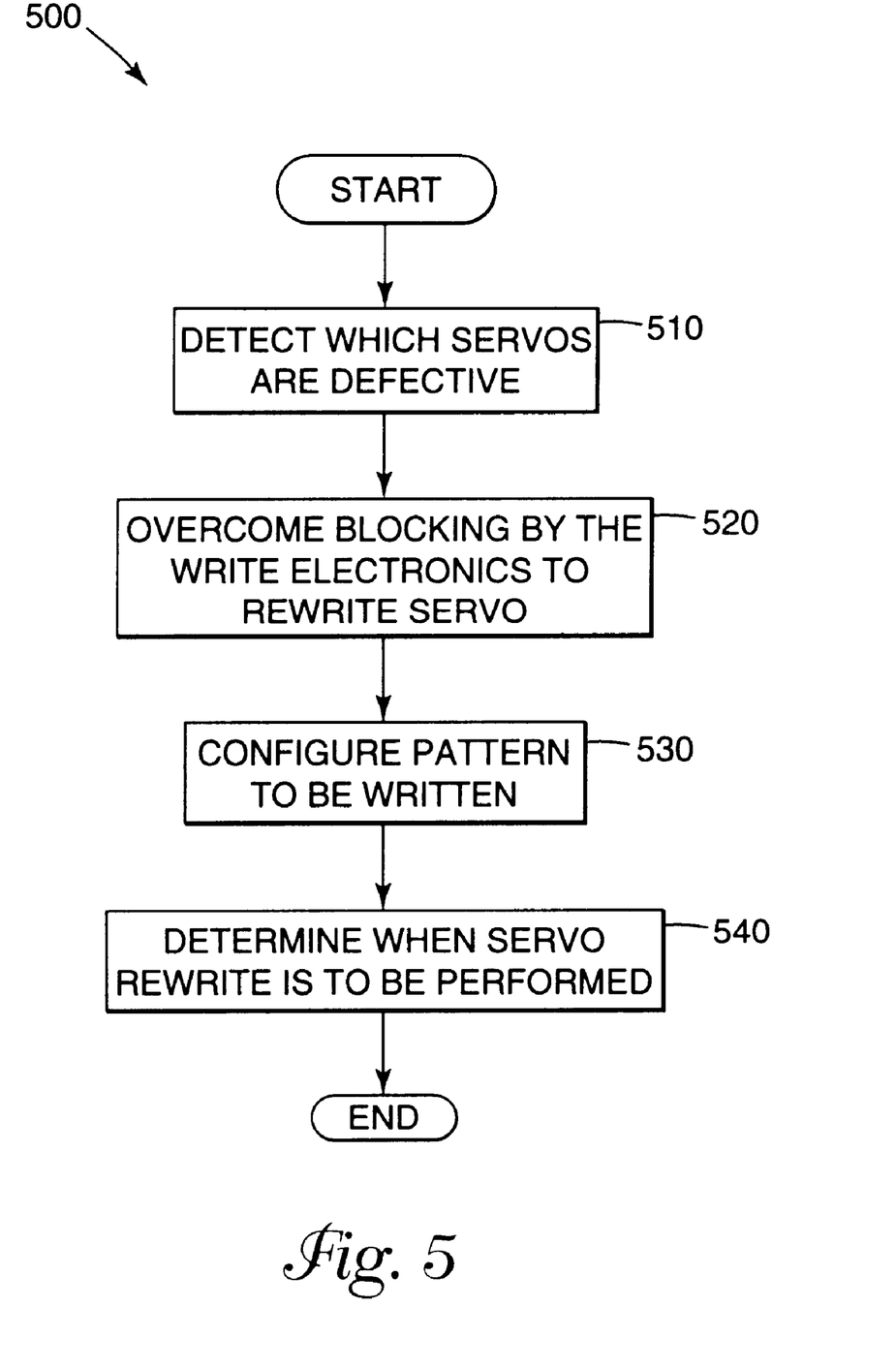
FIG. 5 is a flow chart showing a self servo rewrite process for one embodiment of the present invention.

FIG. 5 is a flow chart showing the self servo rewrite process 500 according to one embodiment of the present invention. According to FIG. 5, defective servo sectors are first detected 510. According to the present invention, the detection of which servo sectors are defective 510 may be performed by a servo surface analysis test (SAT). The servo SAT test is typically performed during the manufacturing process and determines the location of the servo information on each track and detects gray code errors, SID errors, PES errors and other errors. This information may be recorded by a host computer or in a register in the drive electronics. For example, the host computer may issue the appropriate commands to attempt to correct the servo information error. Alternatively, the drive electronics can detect and correct the errors itself. However, additional coding is required for the drive electronics to detect and correct errors. Nevertheless, providing additional code to the drive electronics may be advantageous if a servo rewrite is to be performed in the field.

Then, the blocking by the write electronics is overridden so that all or a portion of the original servo sectors may be rewritten 520. To be able to write the servo field, a method of blocking of the write electronics must be circumvented 520. The servo information in the prior art is only written during manufacture. Thus, there are safeguards in the write electronics to prevent writing in the servo fields to protect the drive from inadvertently rendering the drive inoperable. Still, it is desirable for the drive electronics alone to write the servo fields.

Thereafter, the pattern to be written is configured 530. Finally, the time that the servo rewrite is to be performed is determined 540.

Figure 6:
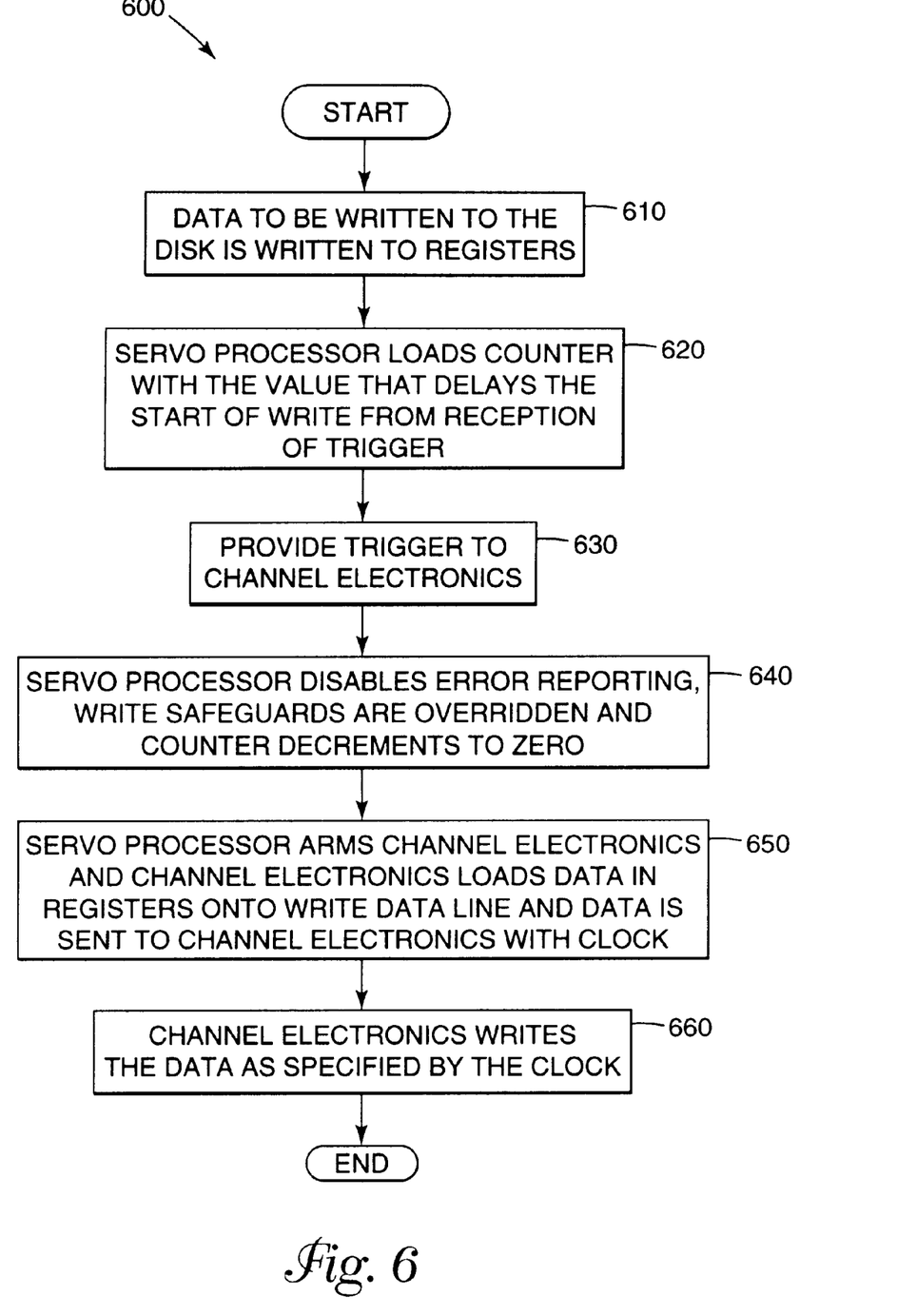
FIG. 6 is a flow chart of a method for writing in the servo field according to one embodiment of the present invention.

FIG. 6 is a flow chart of a method for writing in the servo field 600 according to one embodiment of the present invention. The servo processor writes several registers with the data to be written to the disk 610. Another option is to have the channel electronics generate the pattern. This is more efficient when a fixed frequency PES burst is to be generated, or an erase signal is to be written.

The servo processor then loads a counter with the value that delays the start of write from reception of trigger 620. The trigger is provided to enable the arbitrary placement of the written field 630. The servo processor also disables error reporting and the servo processor or the interface processor may override the write safeguards 640. Then, the servo processor arms the drive electronics circuit 650.

Upon receipt of the trigger, e.g., a servo mark found, the counter decrements to zero as shown in step 640. Once the counter decrements to zero, the data in the registers is sequentially loaded onto the write data line and with a write clock is sent to the channel electronics 650. The channel electronics then writes the data as specified by the clock 660. In this way an arbitrary pattern can be written at an arbitrary location on the disk.

With regard to the triggering 630, if the servo data on the disk is coherent, i.e., the pulses are aligned in time from one track to the next, then another requirement is that the data to be written needs to be synchronized with the data already on the disk. This can be done using the existing servo ID mark on the servo sector as the trigger. The detection delay is fixed. Once the delay is accounted for, the only real impediment to aligning the existing data is getting the write clock's phase correct. For example, a 40 MHz clock can write a 10 MHz pattern with one of four phases. If this is inadequate resolution then the write clock can be phase locked to the original data using the servo AGC field. In fact, if the AGC frequency is low enough, a prior servo ID can be used to provide data alignment, and the AGC field can be used to correct any drift due to motor speed errors.

If the servo data is incoherent, then the alignment requirement is less stringent. Now all that is required is that the servo sector be written within about a hundred nanoseconds of the original position. This accuracy is easily met by aligning the write clock to the servo ID from a prior sector. To ease matters more, the servo pattern can be specifically designed with these margins in mind.

Now turning to the writing of a pattern 610, several options are available. First, the entire servo pattern for that sector can be rewritten. Alternatively, only a particular PES burst, or a digital information field or track ID may be written. Another alternative is to erase the offending field in the sector and to use this as a signal to the servo at a later time to indicate that the data is invalid. That is, if the gray code is zero, it was erased, so the zero may be ignored.

Figure 7:
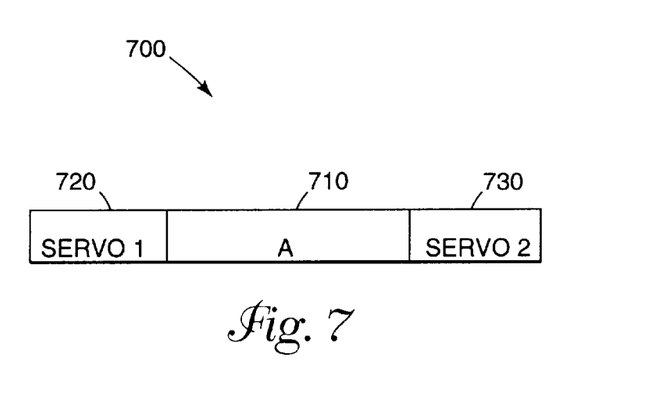
FIG. 7 illustrates the use of a separate servo field for indicating whether another field in the servo sector is to be ignored.

A more desirable alternative is to write a separate field that specifies if any of the fields in the sector are to be ignored. FIG. 7 illustrates the use of a separate servo field for indicating whether another field in the servo sector is to be ignored 700. In FIG. 7, a separate servo field 710 between a first servo sector 720 and a second servo sector 730 indicates which portions of a servo sector is valid. The separate servo field 710 may refer to either the first 720 or second 730 servo sector. Further, two separate servo fields 710 may be used: one at the read center and one at the write center. The default value is written at servowrite, and rewritten at servo rewrite as needed. This field may be difficult to read at both read and write offset, so two fields can be used.

The above method may be implemented by having the host, or the tester if during manufacture, specify which sectors to rewrite and with what pattern. Alternatively, the rewrite may be made independent of the host. While making the rewrite independent of the host may be more difficult to implement, the possibility of doing servo rewrite as part of a recovery procedure in the field is facilitated. In fact this method is flexible enough that if a thermal asperity were to grow in a the gray code field can be ignored while the thermal asperity is present, but then used after the thermal asperity is burnished, or moved away.

In summary, a method and apparatus is disclosed for detecting the servo sectors that contain defects that need to be rewritten and writing in the servo field to correct the detected defects. According to the present invention, arbitrary patterns are written in arbitrary locations on the disk to correct the detected defects. The servo information may be written using just the drive electronics and the servo processor may be used to trigger the drive electronics to cause an arbitrary pattern to be written in an arbitrary location.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing self servo rewrites, comprising the steps of:

detecting defective servo sectors on a disk;

overriding write blocking that prevents an overwriting of original servo fields; and rewriting in a servo field to correct at least a portion of the detected defective servo sectors.

2. The method of claim 1 wherein the defective servo sectors comprise track ID errors, sector ID errors, or PES errors.

3. The method of claim 1 wherein the step of detecting defective servo sectors on a disk is performed by drive electronics.

4. The method of claim 1 wherein the step of detecting defective servo sectors on a disk is performed by a host computer.

5. The method of claim 1 wherein the step of rewriting in the servo field further comprises the step of writing a constant frequency pattern in the servo sector.

6. The method of claim 1 wherein the step of rewriting in the servo field further comprises the steps of configuring a pattern to be written.

7. The method of claim 6 further comprising the steps of writing the pattern to registers and triggering a delayed writing of the pattern on the disk.

8. The method of claim 7 wherein the step of triggering the delayed writing of the pattern on the disk further comprises the step of detecting a sector ID and issuing a trigger for initiating the delayed writing of the pattern on the disk in response to the detection of the sector ID.

9. The method of claim 1 wherein the step of rewriting in the servo field further comprises the step of determining when the servo rewriting is to be performed.

10. The method of claim 1 wherein the step of rewriting in the servo field further comprises the step of synchronizing a rewriting of a pattern with data previously recorded in servo sectors on the disk.

11. The method of claim 10 wherein the step of synchronizing a rewriting of a pattern with data in the previously recorded in servo sectors on the disk further comprises the steps of triggering on a servo ID mark on the servo sector and aligning the pattern according to a write clock.

12. The method of claim 11 wherein the step of aligning the pattern according to a write clock further comprises the step of phase locking the write clock with the original data using a servo AGC field.

13. The method of claim 1 wherein the step of rewriting in the servo field further comprises the step of rewriting a pattern on the disk in the sector field within a predetermined time of original servo data.

14. The method of claim 13 wherein the step of rewriting a pattern on the disk in the sector field within a predetermined time of original servo data further comprises the step of aligning a write clock to a servo ID from a prior sector.

15. The method of claim 1 wherein the step of rewriting in the servo field further comprises the step of rewriting servo information while serving on previously written servo data.

16. The method of claim 1 wherein the step of rewriting in the servo field further comprises the step of rewriting only a portion of the servo sector.

17. The method of claim 1 wherein the step of rewriting in the servo field further comprises the step of writing a servo field to identify portions of the servo sector that are valid.

18. The method of claim 1 wherein the step of rewriting in the servo field further comprises the step of writing a servo field identifying portions of the servo sector that are invalid.

19. The method of claim 1 wherein the step of rewriting in the servo field further comprises the step of writing a first and second servo field containing identifying information regarding valid and invalid portions of the servo sector, wherein the first servo field is at the read center and the second servo field is at the write center.

20. The method of claim 1 wherein the step of rewriting in the servo field further comprises the step of rewriting servo sectors during operation in a customer environment.

21. The method of claim 1 wherein the step of rewriting in the servo field further comprises:
   eliminating thermal asperities from sites on the disk; and
   rewriting servo sectors to recover the sites formerly affected by the thermal asperities.

22. The method of claim 1 wherein the step of rewriting in the servo field further comprises the step of erasing a portion of the servo pattern.

23. A disk drive comprising:
   a disk for storing data in data regions, the disk further comprising a plurality of servo regions diametrally formed between the data regions;
   a motor for rotating the disk;
   an actuator arm assembly including a head for reading and writing data on the disk;
   drive electronics, electrically coupled to the head, for detecting defective servo sectors on the disk, overriding write blocking that prevents an overwriting of original servo fields and rewriting a servo portion in the servo sector to correct at least a portion of the detected defective servo sectors.

24. The disk drive of claim 23 wherein the drive electronics further comprise:
   arm electronics, coupled to the head, for receiving read and write signals for reading and writing data on the disk;
   a channel electronics circuit, coupled to the arm electronics, for rewriting the servo portion on the disk in response to a trigger;
   an interface processor, coupled to the channel electronics circuit, for processing control signals and data between the channel electronics circuit and a host processor; and
   a servo processor, coupled to the interface processor, for analyzing detected servo fields to detect servo signals and errors therein and to provide the trigger for initiating a servo rewrite by the channel electronics circuit.

25. The disk drive of claim 24 wherein the trigger provided by the servo processor to the channel electronics circuit is derived by detecting a servo ID on the disk.

26. The disk drive of claim 24 further comprising a data line coupling the servo processor and the interface processor for passing data there between.

27. Drive electronics for processing signals from arm electronics identifying defective servo sectors on a storage medium and rewriting a servo portion in the servo sector to correct the detected defective servo sectors, comprising:
   a channel electronics circuit for rewriting the servo portion on the storage medium in response to a trigger;
   an interface processor, coupled to the channel electronics circuit, for processing control signals and data between the channel electronics circuit and a host processor, and to override write blocking that prevents an overwriting of original servo fields; and
   a servo processor, coupled to the interface processor, for analyzing detected servo fields to detect servo signals and errors therein and to provide the trigger for initiating a servo rewrite by the channel electronics circuit.

28. The drive electronics of claim 27 further comprising a data line coupling the servo processor and the interface processor for passing data there between.

29. The drive electronics of claim 27 wherein the trigger provided by the servo processor to the channel electronics circuit is derived by detecting a servo ID on the storage medium.

* * * * *

UNITED STATES PATENT AND TRADEMARK OFFICE
CERTIFICATE OF CORRECTION

PATENT NO. : 6,181,500 B1  
DATED : January 30, 2001  
INVENTOR(S) : Serrano et al.

Page 1 of 1

It is certified that error appears in the above-identified patent and that said Letters Patent is hereby corrected as shown below:

<u>Column 4,</u>
Line 37, change "an" to -- a --

Signed and Sealed this

Thirtieth Day of April, 2002

*Attest:*

*Attesting Officer*

JAMES E. ROGAN  
*Director of the United States Patent and Trademark Office*